United States Patent Office 3,116,767
Patented Jan. 7, 1964

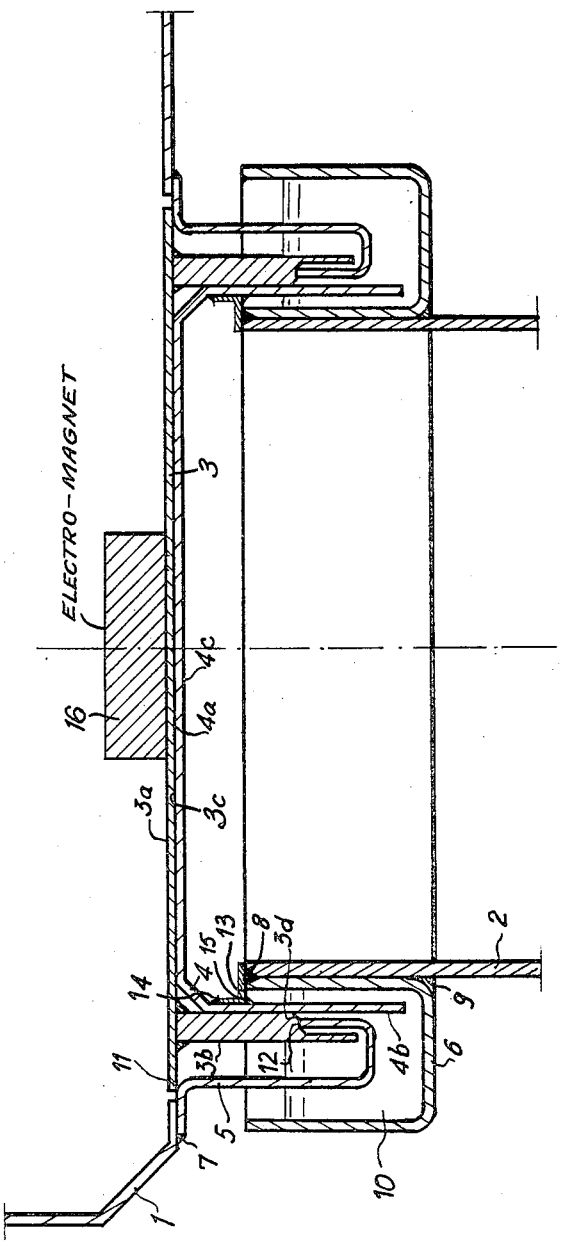

3,116,767
FLUID-TIGHT INTERCOMMUNICATION AND DISCONNECTING DEVICE FOR TWO SUPERPOSED CHAMBERS
Jean Blin, Sucy-en-Brie, Seine-et-Oise, and André Valentin, Paris, France, assignors to Commissariat a l'Energie Atomique, Paris, France
Filed Oct. 27, 1960, Ser. No. 65,535
Claims priority, application France Nov. 6, 1959
10 Claims. (Cl. 141—348)

The present invention relates to an opening and closing device disposed between two fluid-tight chambers for the introduction or removal from one of the fluid-tight chambers into the other, of contaminated products or materials and allowing separation of the chambers without contamination spreading to the outside atmosphere. By contaminated products or materials it is meant those capable of polluting the atmosphere by emanations of radioactive aerosols or by transmission by contact of pulverulent substances which are either toxic or radioactive, or those capable of creating a hazard on contact with the air, such as pyrophoric powders, for example.

This invention relates more particularly, although not exclusively, to a chain of fluid-tight cells or chambers for the storage or working up of radioactive materials and to an opening and closing device connecting the cells with one another or connecting a cell and a fluid-tight handling apparatus, such as a conveyor.

There are many opening and closing devices, such as lock chambers, which provide a fluid-tight joint between two fluid-tight fixed chambers. These devices do not prevent the spreading of the contamination when the fluid-tight chambers are separated. In that case, it is possible to alleviate this drawback by certain artifices, for example by employing a flexible plastic sleeve which can be welded in place when separation is carried out. These artifices, however, are troublesome, troublesome to apply and frequently do not afford absolute safety during working because of danger of breaking due to cutting of the plastic sleeve.

The present invention has for its object an opening and closing device which remedies these drawbacks.

The present device is characterized essentially in that it is formed of two covers fitting closely one within the other. The assembly of these two covers is interposed between the openings of two superposed fluid-tight chambers made of a non-magnetic material. The upper cover, covering the lower cover, is retractable towards the interior of the upper fluid-tight chamber and is made of a non-magnetic material. This cover rests on a flange fast with said upper fluid-tight chamber and bordering the opening of the latter. The lower cover is retractable towards the outside of the lower fluid-tight chamber. It rests on the edges of the opening of said lower fluid-tight chamber. The fluid-tightness of the device is provided by a special seal which is liquid and dense at the moment of opening and closing of said device. This liquid is contained in a trough fast with the lower liquid-tight chamber surrounding the opening of the latter. The lateral walls of said covers and the flange fast with the upper fluid-tight chamber fit into this trough.

This device moreover comprises the following characteristic points, taken separately or in combination:

The special seal may be formed by a material which is solid under ordinary temperature and pressure conditions and easily liquefiable, by any known means, at the moment of opening and closing of said device; or The special seal may be formed by a material which is liquid and dense under ordinary temperature and pressure conditions;

The control for opening and closing said device may be constituted by an electromagnet inside the upper fluid-tight chamber and adapted to be operated from inside the latter; or The control for opening and closing said device may be constituted by a permanent magnet inside the upper fluid-tight chamber and adapted to be operated from inside the latter;

The lower cover may be made of a magnetic material; or

The lower cover may be made of a non-magnetic material and carry a piece of mild steel or a permanent magnet fixed to its inner face.

The solid and easily liquefiable materials forming the special seal may be either very fusible metals, such as indium, lead, tin alloys, for example, or non-metallic materials, such as pitch or the thermoplastics. The liquid and dense materials may be either metallic, such as mercury, for example, or aqueous solutions of dense salts, such as zinc bromide or barium iodide, and in general liquid metalloid compounds of various metals employed in the composition of "dense liquids" used for gravimetric separation processes.

Such a device offers many advantages, the principal one of which resides in the absence of any spreading of the contamination towards the outside atmosphere, either on the introduction or removal of contaminated products or materials from one of the fluid-tight chambers into the other, or on the disconnection of said chambers, for the purpose, for example, of decontaminating one of them.

Another important advantage resides in the opening and closing control of the device which, in addition to its very great simplicity, does not require any fluid-tight passages needed by any control system disposed outside the fluid-tight chambers.

Other characteristics and advantages will appear more clearly on reading the following description and the drawing.

The drawing is a diagrammatic section of the device forming the object of the invention according to one embodiment.

This form of construction relates to fluid-tight chambers having circular openings. The device forming the object of the invention then has a shape of revolution which makes the reading of the drawing easier, but it should be clearly understood that this form of construction is in no way limitative, both as regards the shape of the openings and that of the device, which may be as varied as possible.

There will be seen in the drawing the upper fluid-tight chamber 1, the lower fluid-tight chamber 2, the upper cover 3, the lower cover 4, the flange 5 fast with the upper fluid-tight chamber 1 by means of the weld 7 and the trough 6 fast with the lower fluid-tight chamber 2 by means of the welds 8 and 9.

The trough 6 contains the special seal 10 and, if required, in the event of the special seal being an easily liquefiable solid, known heating means, which are not shown in the drawing.

The cover 3 rests on the flange 5 through the intermediary of the two surfaces of contacts 11 and 12.

The cover 4 rests on the edges of the opening of the lower fluid-tight chamber 2 on angle iron 13 with which is secured thereto by welds 14 and 15.

In order better to describe the operation of the device and the advantages which it offers, and with reference to the accompanying drawing:

3a is the surface of the cover 3 which, when at rest, is in contact with the contamination prevailing in the upper fluid-tight chamber 1.

3b is the surface of the cover 3 which, when at rest, faces the inner surface of the flange 5 while 3c is the surface of the cover 3 which, when at rest, is in contact with the cover 4.

3d is the surface of the cover 3 between the cover 4 and the flange 5, this surface having minimum area required for the flow of the special seal when the device is opened and closed.

4a is the surface of the cover 4 which, when at rest, is in contact with the cover 3 and 4b is the surface of the cover 4 which, when at rest, is immersed in the special seal 10.

4c is the surface of the cover 4 which, when at rest, is in contact with the contamination prevailing in the lower fluid-tight chamber 2.

The assembly of the device requires connection of the two fluid-tight chambers 1 and 2, the upper fluid-tight chamber 1 being provided with its cover 3 and the lower fluid-tight chamber 2 with its cover 4, the special seal 10 being liquid. The upper cover 3 fits the lower cover 4 closely. The device then provides fluid-tight separation between the two fluid-tight chambers 1 and 2.

In order to carry out the transfer of contaminated products or materials between the fluid-tight chambers 1 and 2, an electromagnet or a permanent magnet 16 is brought into contact with the surface 3a of the upper cover 3 from inside the upper fluid-tight chamber 1 by any suitable means and in particular by means of a remote-controlled manipulating device.

Raising of the energised electromagnet or the permanent magnet results in the movement of the assembly consisting of the two covers 3 and 4 towards the interior of the upper fluid-tight chamber 1. During this movement, the surfaces 3a, 3b and 3d of the cover 3 and the surfaces 4b and 4c of the cover 4 are contaminated.

When the transfer of contaminated products or materials is completed, covers 3 and 4 are replaced from inside the upper fluid-tight chamber 1, by deenergizing the electromagnet. If a permanent magnet is used it is raised by first rocking it, which detaches it from the surface 3a, and then moving it away from the covers.

The level of the special seal 10 is such that, with the device in the closed position, the surface 3d of the upper cover 3 is immersed. The contamination adhering to this minimum surface is then very greatly diluted by the special seal in the liquid state.

When it is desired to separate the two fluid-tight chambers, for example in order to decontaminate one of them, the upper fluid-tight chamber 1 is raised, carrying with it the upper cover 3. The cover 4 then remains in position on the lower fluid-tight chamber 2.

Thus, only the surfaces 3c and 3d of the upper cover 3 and the surface 4a of the lower cover 4 are in contact with the outside atmosphere. The surfaces 3c and 4a have never been in contact with the contamination and the minimum surface 3d, which has, in fact, been in contact therewith, has been subjected to the diluting action of the special seal.

The result is that on such separation and also on the opening or closing of the device, the contamination cannot spread through the outside atmosphere.

What is claimed is:

1. A fluid-tight intercommunication and disconnecting structure for upper and lower chambers of non-magnetic material, comprising a first opening in a wall of said lower chamber, an upper chamber of non-magnetic material mounted on said lower chamber, a second opening in a wall of said upper chamber opposite said first opening, an inwardly extending flange on said upper chamber around said second opening, a first cover of non-magnetic material closing said second opening resting on said flange and retractable within said upper chamber, a second cover resting on the edges of and closing said first opening and mounted within said first cover and retractable with said first cover into said upper chamber, a trough secured to said lower chamber about said first opening, a sealing material in said trough, a continuous surface on said second cover extending around said first opening in said trough into said sealing material, a continuous surface on said first cover extending around said first surface into said sealing material and a continuous surface depnding from said flange extending around said second surface into said sealing material.

2. A device according to claim 1, wherein said sealing material is an inorganic material which is solid under ordinary temperature and pressure conditions and easily liquefiable at the moment of opening and closing of said structure.

3. A device according to claim 1, wherein said sealing material is an organic material which is solid under ordinary temperature and pressure conditions and easily liquefiable at the moment of opening and closing of said structure.

4. A device according to claim 1, wherein said sealing material is an inorganic material which is liquid and dense under ordinary temperature and pressure conditions.

5. A device according to claim 1, wherein said sealing material is a dense liquid.

6. A device according to claim 1, including means for opening and closing said covers comprising an electromagnet inside said upper chamber operated from inside said upper chamber.

7. A device according to claim 1, including means for opening and closing said covers comprising a permanent magnet inside said upper chamber operated from inside said upper chamber.

8. A device according to claim 1, wherein said second cover is made of a magnetic material.

9. A device according to claim 1, wherein said second cover is made of a non-magnetic material and a piece of mild steel is fixed to the inner face of said second cover.

10. A device according to claim 1 wherein said first cover is made of a non-magnetic material and includes a permanent magnet fixed to the inner face of said second cover.

References Cited in the file of this patent

UNITED STATES PATENTS 643,230   Moller _____ Feb. 13, 1900